Patented Nov. 27, 1928.

1,693,112

UNITED STATES PATENT OFFICE.

FRAZIER GROFF, OF VERONA, NEW JERSEY, ASSIGNOR TO BAKELITE CORPORATION, OF NEW YORK, N. Y., A CORPORATION OF DELAWARE.

PHENOL RESIN AND PROCESS OF MAKING SAME.

No Drawing.   Application filed February 21, 1927. Serial No. 170,059.

This invention comprises a novel resinous composition including resinous condensation products of phenol (including cresols) with furfural and methylene-containing bodies; and a process whereby such resinous compositions may be prepared in a fully dehydrated condition and in suitable physical state for the compounding of molding mixtures, laminated products, varnishes, and the various other applications for which these products are suitable.

It is well known that phenols may react with furfural, in presence of appropriate condensing agents, to form resinous condensation products which are reactive in the sense that they may be rendered insoluble and infusible by sufficient application of heat. Such resins however exhibit a strong tendency to gelatinize at an early stage of the heating, before they are fully dehydrated: so that as prepared in the past they have been not only imperfectly reacted, but also imperfectly dehydrated. Both of these characteristics have militated against their industrial use: for imperfectly reacted furfural resins are extremely slow to harden under the hot-pressing operation; and the imperfectly dehydrated resins are inferior for electrical purposes. According to my invention both of these defects are overcome.

I have found that if a mixture of phenol or cresol and furfural or a partial reaction product of such mixture, be admixed with a permanently fusible, or non-reactive, resin which may be either natural or synthetic but is preferably of the phenol-methylene type, and the mixture subjected to further heating, it is possible to advance the reaction between the phenol and furfural to a point where the final hardening will take place rapidly under the usual conditions of hot-press molding; and that it is likewise possible to dehydrate the phenol-furfural resin completely without gelatinizing the mass. Thereby I obtain a resinous composition which sets on cooling to a hard and brittle mass well adapted for pulverizing in a ball-mill, and for incorporation with the usual fibrous or other fillers in the manufacture of molding mixtures; and likewise well adapted for other applications as noted above. After the reaction between the phenol and furfural has sufficiently advanced, and the resinous product of this reaction has been fully dehydrated, I incorporate therewith sufficient of a methylene-containing hardening agent (usually and preferably hexamethylenetetramine) to convert the fusible phenol-methylene component of the mixture into a potentially reactive composition. Such conversion is well understood in this art. At the same time the necessary fillers, lubricants, solvents, colors, and the like desired in the molding mixture may be incorporated. The result is a molding compound which hardens quickly in the hot-molding operation, and yields molded products of excellent physical and electrical properties, and appearance. This molding compound is also well adapted for use in the so-called cold-molding operation, in which the shaping of the article in the press is accomplished without complete transformation of the resin, which is then subjected to an after-baking operation.

Proportions of the fusible phenol-methylene resin as low as 30% by weight of the phenol-furfural resin have been found effective in facilitating the dehydration of the latter; and proportions as high as 80% or upward may be used. When the proportion of phenol-methylene resin exceeds about 50% of the resin content of the mixture, this latter begins to take on the essential qualities of the known reactive phenol-methylene compositions, plasticized by the phenol-furfural resin. Accordingly my invention contemplates broadly a completely dehydrated, reactive resin composition including resinous components of the phenol-furfural and the non-reactive phenol-methylene types.

Following is an illustrative example in accordance with the invention, it being understood that the invention is not restricted to the particular proportions or to the manipulations described:

A mixture of phenol and furfural in about molecular proportions is heated in presence of an alkaline condensing agent to a temperature of 110°–160° C. Suitable condensing agents are sodium hydroxid or carbonate, the oxids or hydroxids of calcium and magnesium, pyridin, hexamethylenetetramine, etc. The duration of the heating may be widely varied, as from 1 to 10 hours, but should be so limited as to avoid gelatinization of the mixture. At the conclusion of this operation the desired amount of non-reactive phenol-methylene or essentially similar resin is added, and the heating continued at about 145–150° C. until the resin forming reaction is sufficiently advanced, and the mixture is thoroughly dehydrated. It is possible that some reaction may occur at this stage between the fusible resin and the furfural, but if so this is secondary to the main reaction between the phenol and the furfural. Hexamethylenetetramine in proportion to impart a reactive character to the phenol-methylene resin is then added, together with the necessary constituents of the complete molding mixture as already described.

The non-reactive phenol-methylene resin may be partly or wholly replaced by other non-reactive resins including natural resins such as rosin, etc. Proportions of non-reactive resin as low as 10-20% of the phenol-furfural resin have a distinct retarding action on the gelatinization; and larger proportions, of the order of 50-60% of the phenol-furfural resin, permit the mixture to be heated to 180°-190° C. for one-half hour or more without gelatinization, whereby excellent opportunity is afforded for thoroughly dehydrating the mixture and for suitably advancing the reaction between the phenol and furfural.

The dehydrated resins prepared as above are likewise suitable for the manufacture of varnishes, impregnating solutions and the like, by dissolving them in appropriate alcoholic or other solvents. They are well adapted for purposes of electrical insulation, such for example as the impregnation of coils.

I claim:

1. Process of making a dehydrated reactive resin composition, comprising reacting a phenol with furfural in proportion to yield an infusible resin, arresting the reaction before the infusible stage is reached, adding thereto a non-reactive resin, heating the mass to dehydrate the resin and further advance the same, and adding a methylene-containing hardening agent.

2. Process of making a dehydrated reactive resin composition, comprising reacting a phenol with furfural in proportion to yield an infusible resin, arresting the reaction before the infusible stage is reached, adding thereto a non-reactive phenol-methylene resin, heating the mass to dehydrate the resin and further advance the same, and adding a methylene-containing hardening agent.

3. Process of making a dehydrate reactive resin composition, comprising dehydrating a mixture of a reactive phenol-furfural resin and a non-reactive resin, and adding thereto a methylene-containing hardening agent.

4. Process of making a dehydrated reactive resin composition, comprising dehydrating a mixture of reactive phenol-furfural resin and a non-reactive phenol-methylene resin, and adding thereto a methylene-containing hardening agent.

5. The hereindescribed reactive resin composition, comprising a dehydrated mixture including a reactive phenol-furfural resin, and a non-reactive resin.

6. The hereindescribed reactive resin composition, comprising a dehydrated mixture including a reactive phenol-furfural resin, a non-reactive phenol-methylene resin, and a methylene-containing hardening agent for the latter.

In testimony whereof, I affix my signature.

FRAZIER GROFF.